United States Patent
Kondo et al.

(10) Patent No.: US 7,912,375 B2
(45) Date of Patent: Mar. 22, 2011

(54) OPTICAL TRANSCEIVER

(75) Inventors: Harufusa Kondo, Tokyo (JP);
Masahiko Ishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 12/423,931

(22) Filed: Apr. 15, 2009

(65) Prior Publication Data
US 2010/0150567 A1    Jun. 17, 2010

(30) Foreign Application Priority Data
Dec. 15, 2008    (JP) ................. 2008-318071

(51) Int. Cl.
*H04B 10/00* (2006.01)
(52) U.S. Cl. ........................ 398/135; 398/66; 398/70
(58) Field of Classification Search ............ 398/33, 398/66, 70–71, 135–139
See application file for complete search history.

(56) References Cited

U.S. PATENT DOCUMENTS

| | | | |
|---|---|---|---|
| 6,941,077 B2 | 9/2005 | Aronson et al. | |
| 7,050,720 B2 | 5/2006 | Aronson et al. | |
| 7,460,572 B2 | 12/2008 | Kawai et al. | |
| 2005/0031352 A1 | 2/2005 | Light et al. | |
| 2006/0204246 A1 | 9/2006 | Suemura et al. | |
| 2006/0239690 A1* | 10/2006 | Dybsetter et al. | 398/135 |
| 2009/0047026 A1* | 2/2009 | Luo | 398/135 |
| 2009/0067848 A1* | 3/2009 | Ekkizogloy et al. | 398/135 |
| 2009/0138709 A1* | 5/2009 | Ekkizogloy et al. | 713/168 |

FOREIGN PATENT DOCUMENTS

| | | |
|---|---|---|
| JP | 09-162811 A | 6/1997 |
| JP | 2006-136029 A | 5/2006 |
| JP | 2006-191681 A | 7/2006 |
| JP | 2006-253950 A | 9/2006 |
| WO | WO 02/063800 A1 | 8/2002 |
| WO | WO 2004/102754 A1 | 11/2004 |
| WO | WO 2005/107105 A1 | 11/2005 |

* cited by examiner

*Primary Examiner* — Dzung D Tran
(74) *Attorney, Agent, or Firm* — Leydig, Voit & Mayer, Ltd.

(57) ABSTRACT

An optical transceiver performs an optical transmitting and receiving operation, and has a first memory and an external interface. The external interface receives information from a host device and writes the received information in the first memory. The external interface reads the information from the first memory in response to an external command and transfers externally the read information. The information includes at least one of an operation start date, when the optical transceiver starts the optical transmitting and receiving operation, and an operation termination date, when the optical transceiver terminates the optical transmitting and receiving operation.

17 Claims, 14 Drawing Sheets

OPTICAL TRANSCEIVER

BACKGROUND OF THE INVENTION

1. Field of the Invention

The present invention relates to an optical transceiver that is removable from a host device, performs an optical transmitting and receiving operation to receive an electrical signal from the host device, convert the received electrical signal into an optical signal and transmit the converted optical signal to an external, and to receive an optical signal from the external, convert the received optical signal into an electrical signal, and transmit the converted electrical signal to the host device, under the condition that the optical transceiver is attached to the host device. The invention more particularly relates to an optical transceiver capable of managing a history record indicating the operation of the optical transceiver.

2. Background Art

In optical communications using an optical fiber, an optical transceiver that transmits and receives an optical signal is widely used. The optical transceiver is designed based on an industrial standard called Multi-Source Agreement typified by XFP and SFP in many cases. Thus, many of optical transceivers have unified interfaces and unified functions when seen from the externals of the optical transceivers. In contrast, the internal designs of the optical transceivers depend on design concepts of the manufacturers.

The optical transceiver uses its internal functions to detect information such as a power supply voltage applied to the optical transceiver, an internal temperature of the optical transceiver, a bias current applied to a laser, a monitor current applied to a laser, and power of received light and to write the information in a memory, and has a function for monitoring the information in some cases (see, e.g., Patent Document 1). In addition, the optical transceiver has an alarm function for providing a warning and an alarm to an external of the optical transceiver when a parameter indicative of the operational state of the optical transceiver exceeds a specified threshold value in some cases. When the optical transceiver has the alarm function, five memory areas, in which the parameter indicative of the operational state, a first threshold value, a second threshold value, a warning state flag, and an alarm state flag are respectively written, are allocated to the optical transceiver (see, e.g., Patent Document 2). The monitoring function and the alarm function are called digital diagnostic monitoring (DDM).

[Patent Document 1] Japanese Laid-Open Patent Publication No. 2006-191681

[Patent Document 2] Japanese Translations of PCT for Patent No. 2007-535242

In recent years, an optical transceiver (such as a SFP transceiver, a SFP+ transceiver, a XFP transceiver, a XENPAK transceiver and an X2) removable from a host device has been used. After the removable optical transceiver is attached to a host device and used, the removable optical transceiver is attached to another host device and reused. However, the conventional optical transceiver is not capable of managing an operation history record indicating when the optical transceiver starts an operation and an operation history record indicating when the optical transceiver terminates the operation.

SUMMARY OF THE INVENTION

It is, therefore, an object of the present invention to provide an optical transceiver capable of managing a history record indicating an operation of the optical transceiver.

According to one aspect of the present invention, an optical transceiver that is removable from a host device and performs an optical transmitting and receiving operation to receive an electrical signal from the host device, convert the received electrical signal into an optical signal, transmit the converted optical signal to an external, and to receive an optical signal from the external, convert the received optical signal into an electrical signal, and transmit the converted electrical signal to the host device, under the condition that the optical transceiver is attached to the host device. The optical transceiver includes a first memory and an external interface. The external interface writes information received from the host device in the first memory, reads the information written in the first memory in response to a command provided from the external, and transfers the read information to the external. The information includes at least one of information indicative of an operation start date when the optical transceiver starts the optical transmitting and receiving operation and information indicative of an operation termination date when the optical transceiver terminates the optical transmitting and receiving operation.

Other objects and further features of the present invention will be apparent from the following detailed description when read in conjunction with the accompanying drawings.

BEST MODE FOR CARRYING OUT THE INVENTION

Figure 1:
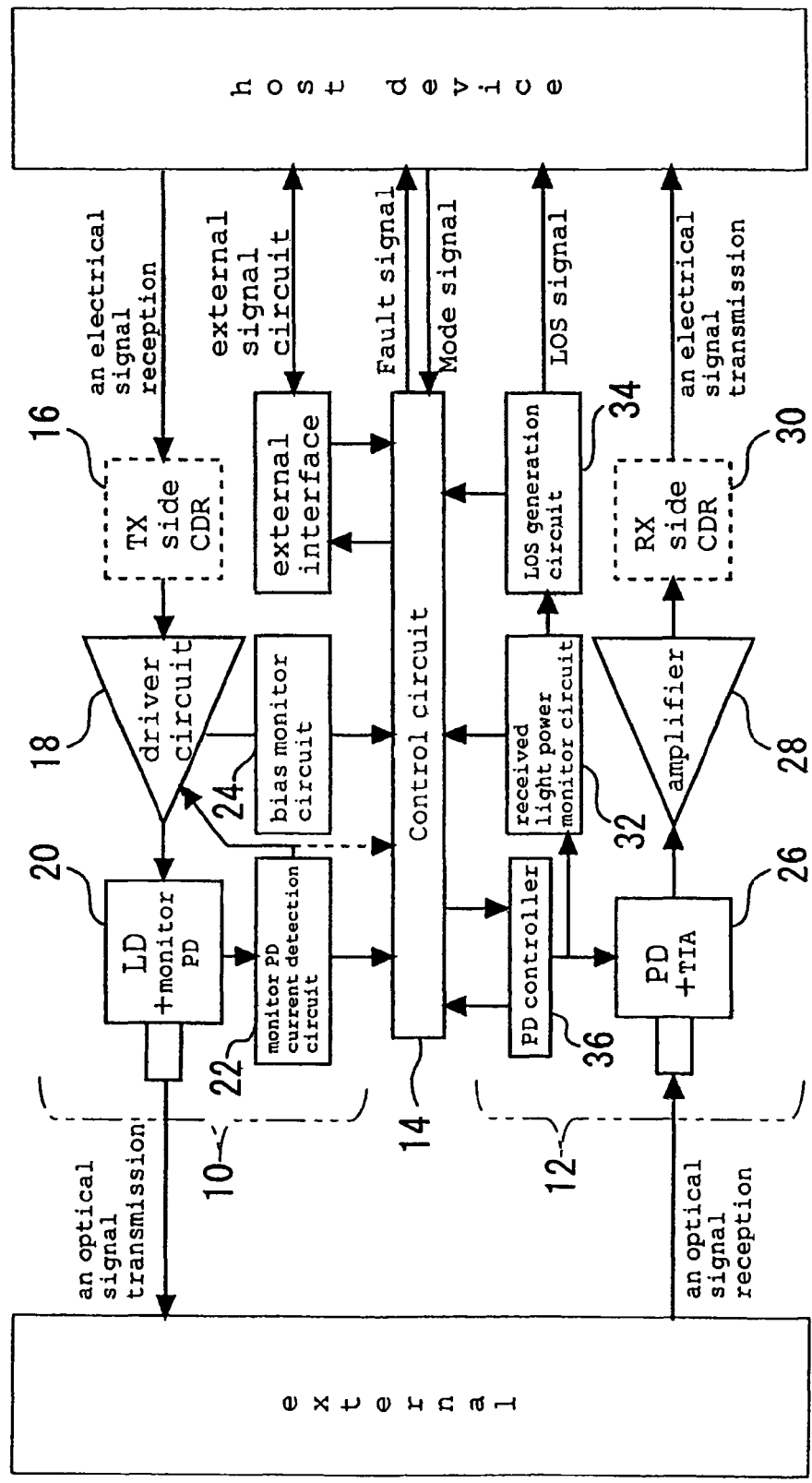
FIG. 1 is a block diagram showing the optical transceiver according to the first embodiment. The optical transceiver is removable from a host device.

Now, embodiments of the present invention will be described with reference to the drawings. Like reference numerals denote like components throughout the drawings, and redundant descriptions will be omitted.

First Embodiment

The first embodiment of the present invention relates to an optical transceiver capable of managing a history record indicating an operation of the optical transceiver. In the first embodiment, the configuration of the optical transceiver, the configuration of a control circuit for the optical transceiver, and control of the optical transceiver are first described. After the description, management of an operation history record on the date when the optical transceiver starts an operation is described.

[Configuration of Optical Transceiver]

The configuration of the optical transceiver according to the first embodiment is described below. FIG. 1 is a block diagram showing the optical transceiver according to the first embodiment. The optical transceiver is removable from a host device. The optical transceiver transmits and receives an optical signal under the condition that the optical transceiver is attached to the host device. The optical transceiver includes a transmitting circuit 10, a receiving circuit 12, and a control circuit 14. The transmitting circuit 10 receives an electrical signal from the host device, converts the received electrical signal into an optical signal, and transmits the converted optical signal to an external. The receiving circuit 12 receives an optical signal from the external, converts the received optical signal into an electrical signal, and transmits the converted electrical signal to the host device. The control circuit 14 controls the transmitting circuit 10 and the receiving circuit 12. The control circuit 14 also controls digital diagnostic monitoring (DDM).

The transmitting circuit 10 includes a transmitting (TX) side clock data recovery (CDR) circuit 16, a driver circuit 18, a laser diode (LD) 20, a monitor photodetector (PD) current detection circuit 22, and a bias monitor circuit 24.

The TX side CDR circuit 16 extracts a clock from the electrical signal received from the host device, and performs retiming on data. Such a CDR circuit is not required for a 2R (reshaping and retransmission) transceiver, and is required for a 3R (reshaping, retransmission and retiming) transceiver. In addition, such a CDR circuit includes an equalizer to correct characteristics of a transmission path of the electrical signal in many cases.

The driver circuit 18 amplifies a signal output from the TX side CDR circuit 16. The driver circuit 18 transmits the amplified signal to the laser diode (LD) 20 to drive the LD 20. The LD 20 has a monitor photodetector (PD). The monitor PD receives branched light from a back surface or front surface of the LD 20. The monitor PD current detection circuit 22 is capable of estimating power of light output from the LD 20 by detecting a current applied to the monitor PD. The monitor PD current detection circuit 22 detects the current applied to the monitor PD to perform feedback on a bias current applied to the driver circuit 18 and a modulated current applied to the driver circuit 18. The monitor PD current detection circuit 22 therefore forms an automatic power control (APC) circuit having a feedback loop to constantly maintain the light output from the LD 20. When a distributed feedback (DFB) laser or the like is used as the LD 20, the APC circuit is provided in many cases. The monitor PD current detection circuit 22 transmits, to the control circuit 14, a signal indicative of the current applied to the monitor PD. The bias monitor circuit 24 transmits to the control circuit 14 a signal indicative of the bias current and modulated current applied to the driver circuit 18.

The receiving circuit 12 has a photodiode (PD) 26, an amplifier 28, a receiving (RX) side CDR circuit 30, a received light power monitor circuit 32 and a loss-of-signal (LOS) generation circuit 34.

The PD 26 receives an optical signal and converts the received optical signal into an electrical signal. The electrical signal is converted into a voltage signal having large amplitude by a trans-impedance amplifier (TIA) provided in a receive optical sub-assembly (ROSA). The ROSA is provided in the PD 26. The amplifier 28 amplifies the signal output from the PD 26 to obtain an electrical signal having large amplitude. In this case, the electrical signal obtained has a voltage of about several hundred m volts and can be used by the external of the optical transceiver. The signal amplified by the amplifier 28 is output to the host device through the RX side CDR circuit 30. Various types of amplifiers such as an automatic gain control (AGC) amplifier and a limiting amplifier can be used as the amplifier 28 depending on the type of the optical transceiver.

The received light power monitor circuit 32 measures power of light output from the PD 26 and transmits a signal indicative of the power to the control circuit 14. The LOS generation circuit 34 generates a loss-of-signal (LOS) signal when the power of the light output from the PD 26 is lower than a certain value. The LOS generation circuit 34 transmits a signal indicative of an operation of the LOS generation circuit 34 to the control circuit 14.

In addition, an avalanche photodetector (APD) can be used instead of the PD 26. If the APD is used, it is necessary that a voltage applied to the APD be controlled by a PD controller 36 to set a multiplication factor of the APD to an appropriate value.

The control circuit 14 receives an analog characteristic signal indicative of an operational characteristic or operational environment of the optical transceiver, such as the bias current, the modulated current, the current applied to the monitor PD, and the power of the light output from the PD 26. The analog characteristic signal is converted into a digital characteristic value. The converted digital characteristic value is written in the control circuit 14. The control circuit 14 has a warning threshold value and an alarm threshold value stored therein. The warning threshold value indicates a value at risk for a parameter (including the bias current and the like and obtained from the digital characteristic value) indicative of the actual operational characteristic or operational environment of the optical transceiver. The alarm threshold value indicates an abnormal value of the parameter. When the parameter exceeds the warning threshold value and the alarm threshold value, the control circuit 14 sets a warning flag and an alarm flag, respectively.

The control circuit 14 compares a bias current applied to the transmitting side with an upper limit and a lower limit, for example. When the bias current is higher than the upper limit or lower than the lower limit, the control circuit 14 outputs a fault signal to the external to inform the external that the control circuit 14 is in an abnormal state in some cases. In addition, when the bias current is higher than the upper limit or lower than the lower limit, the control circuit 14 outputs an interrupt signal to the external to inform the external that the control circuit 14 is in an abnormal state in some cases.

The control circuit 14 is capable of receiving a mode signal from the external. The control circuit 14 is capable of changing a setting of a programmable filter based on the received mode signal. The programmable filter is provided in the amplifier 28 of the receiving circuit 12. Therefore, when the optical transceiver supports operating frequencies from a low-speed operating frequency to a high-speed operating frequency, and when the optical transceiver operates at a low speed, a frequency band of the operation of the optical transceiver can be set to a filter frequency band for the operation at the low speed. As a result, the optical transceiver is capable of cutting high frequency noise. Due to the cutting of the high frequency noise, the optical transceiver can increase sensitivity of signal reception.

In the above description, it is assumed that the electrical signal received by the optical transceiver is composed of a single signal or two signals constituting a differential pair. However, the optical transceiver is not limited to the assumption. The optical transceiver may receive an electrical signal composed of a plurality of low-speed signals. In this case, it is necessary that the TX side CDR circuit 16 have a MUX circuit having a MUX function capable of converting the plurality of low-speed signals into high-speed signals.

A part of the optical transceiver may be removed or changed. For example, the monitor circuits are not necessarily required. In addition, a photodetector may be used instead of the PD 26.

[Configuration of Control Circuit of Optical Transceiver]

Figure 2:
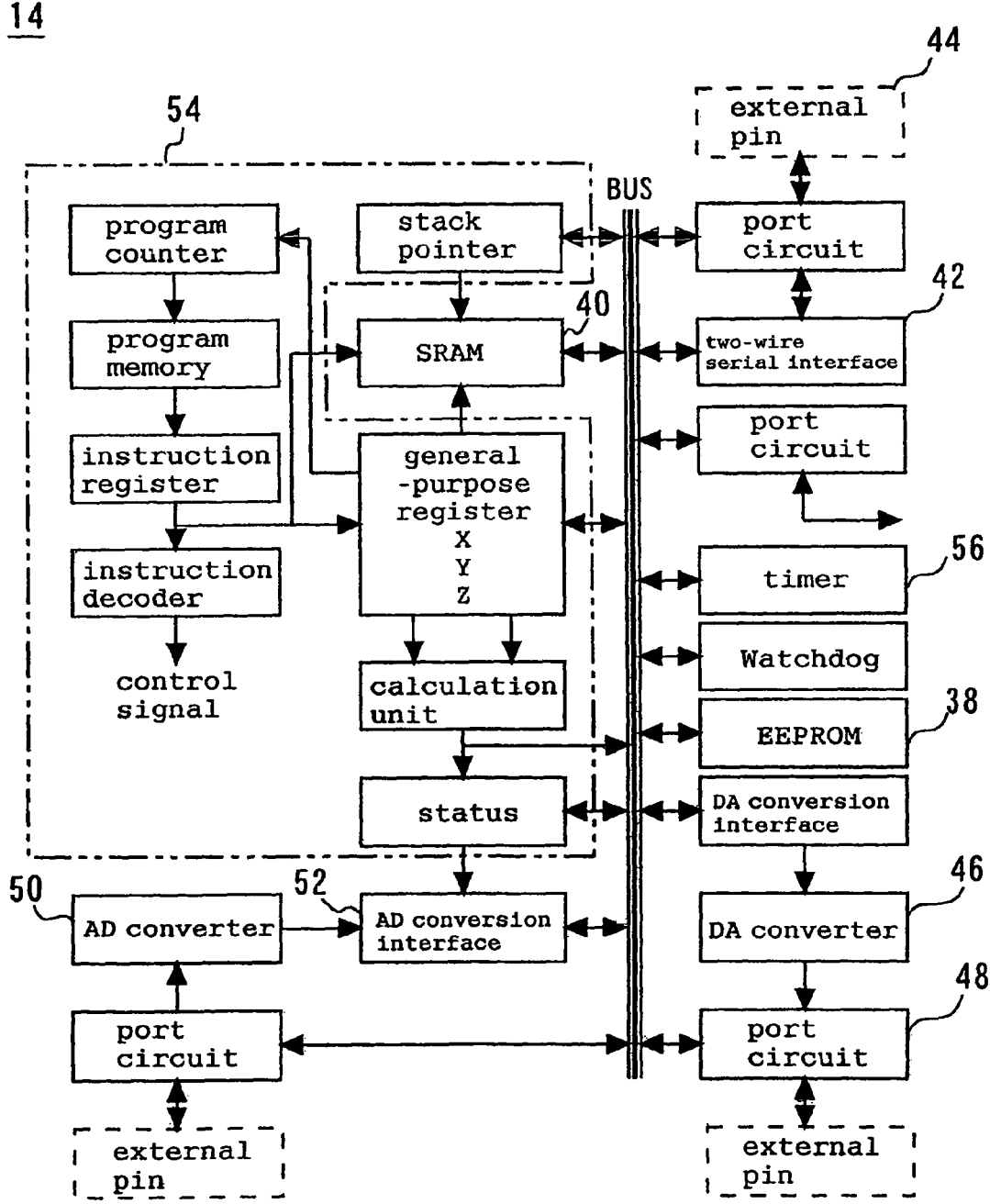
FIG. 2 is a block diagram showing the control circuit of the optical transceiver according to the first embodiment.

The control circuit of the optical transceiver according to the first embodiment is described below in detail. FIG. 2 is a block diagram showing the control circuit of the optical transceiver according to the first embodiment.

As shown in FIG. 2, the control circuit 14 has an electrically erasable programmable read only memory (EEPROM) 38, a static random access memory (SRAM) 40, and a two-wire serial interface 42. The EEPROM is a nonvolatile memory and serves as a first memory. The two-wire serial interface 42 serves as an external interface.

The warning threshold value, the alarm threshold value, the parameter indicative of the actual operational characteristic or operational environment, the warning flag and the alarm flag are written in the EEPROM 38 or the SRAM 40.

The two-wire serial interface 42 accesses the EEPROM 38 or the SRAM 40. The two-wire serial interface 42 reads the warning threshold value, the alarm threshold value, the parameter indicative of the actual operational characteristic or operational environment, the warning flag and, the alarm flag, in response to a command provided from the external, and transfers the read data to the external. The two-wire serial interface 42 receives information from the host device connected with an external pin 44 and writes the received information in the EEPROM 38. The two-wire serial interface 42 reads the received information in response to a command provided from the external, and transfers the read information to the external.

Figure 3:
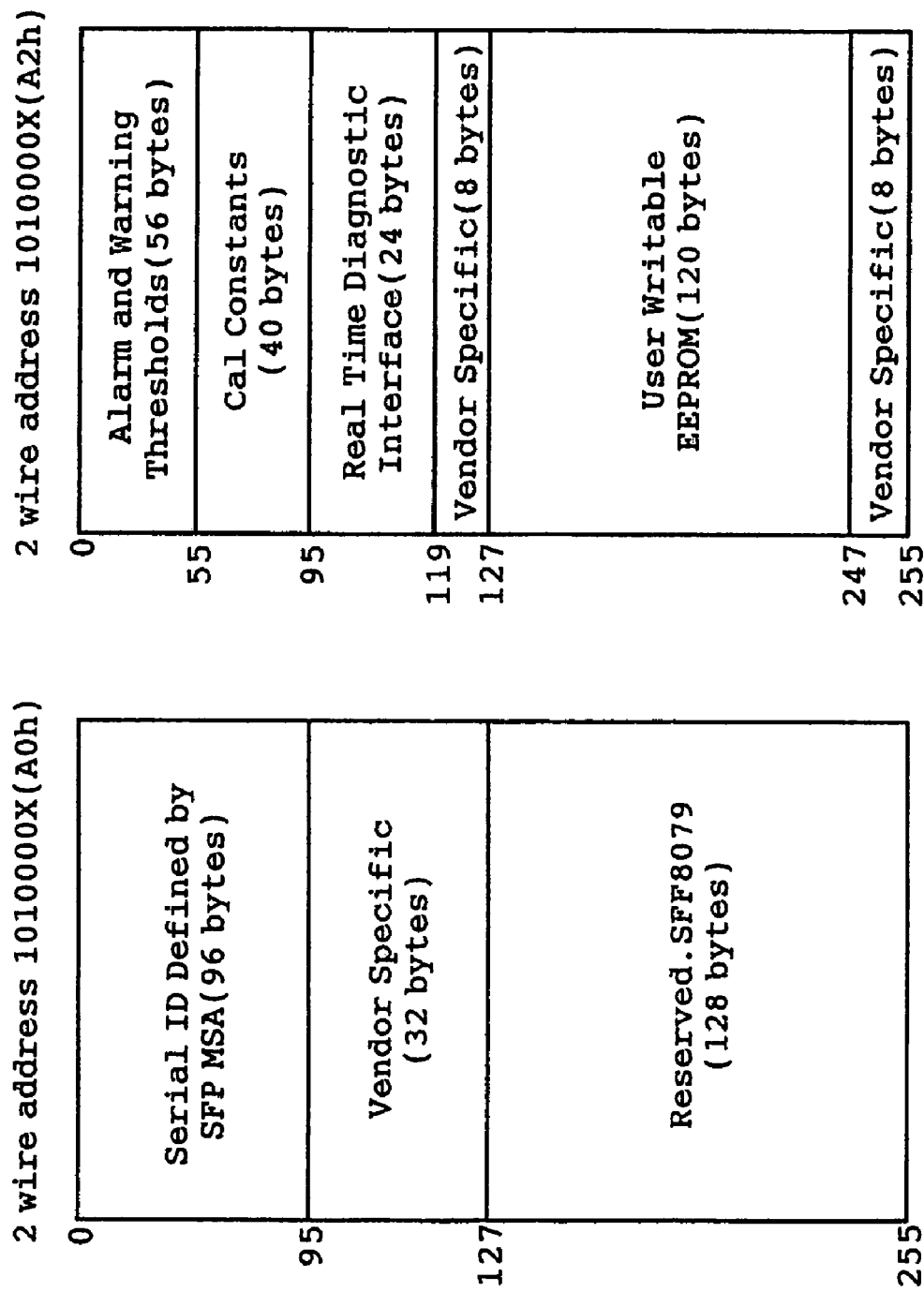
FIG. 3 is a diagram showing memory maps of memory areas that are accessed by the two-wire serial interface according to the first embodiment.

FIG. 3 is a diagram showing memory maps of memory areas that are accessed by the two-wire serial interface according to the first embodiment. The layouts of the memory maps are defined according to SFF-8472 Standard. Identification information (serial ID defined by SFP MSA (96 bytes)) for the optical transceiver is stored in the memory area corresponding to an address A0h in the memory map. The warning and alarm threshold values, a calibration constant, and the digital characteristic value (real time diagnostic interface) are stored in stored in the memory area corresponding to an address A2h in the memory map. The calibration constant is used to convert the digital characteristic value into the parameter indicative of the actual operational characteristic or operational environment of the optical transceiver.

A digital-to-analog (DA) converter 46 and a port circuit 48 sets the driver circuit 18. An analog-to-digital (AD) converter 50 converts the analog characteristic signal into the digital characteristic value, and an AD conversion interface 52 writes the converted digital characteristic value in the EEPROM 38 or the SRAM 40.

The control circuit 14 has an information processor 54. The information processor 54 has a general-purpose register, a calculation unit, a stack pointer, a status, a program counter, a program memory, an instruction register, and an instruction decoder. The information processor 54 executes programs to perform respective types of information processing.

A timer 56 measures a period of time to execute processing of control software.

[Control of Optical Transceiver]

Figure 4:
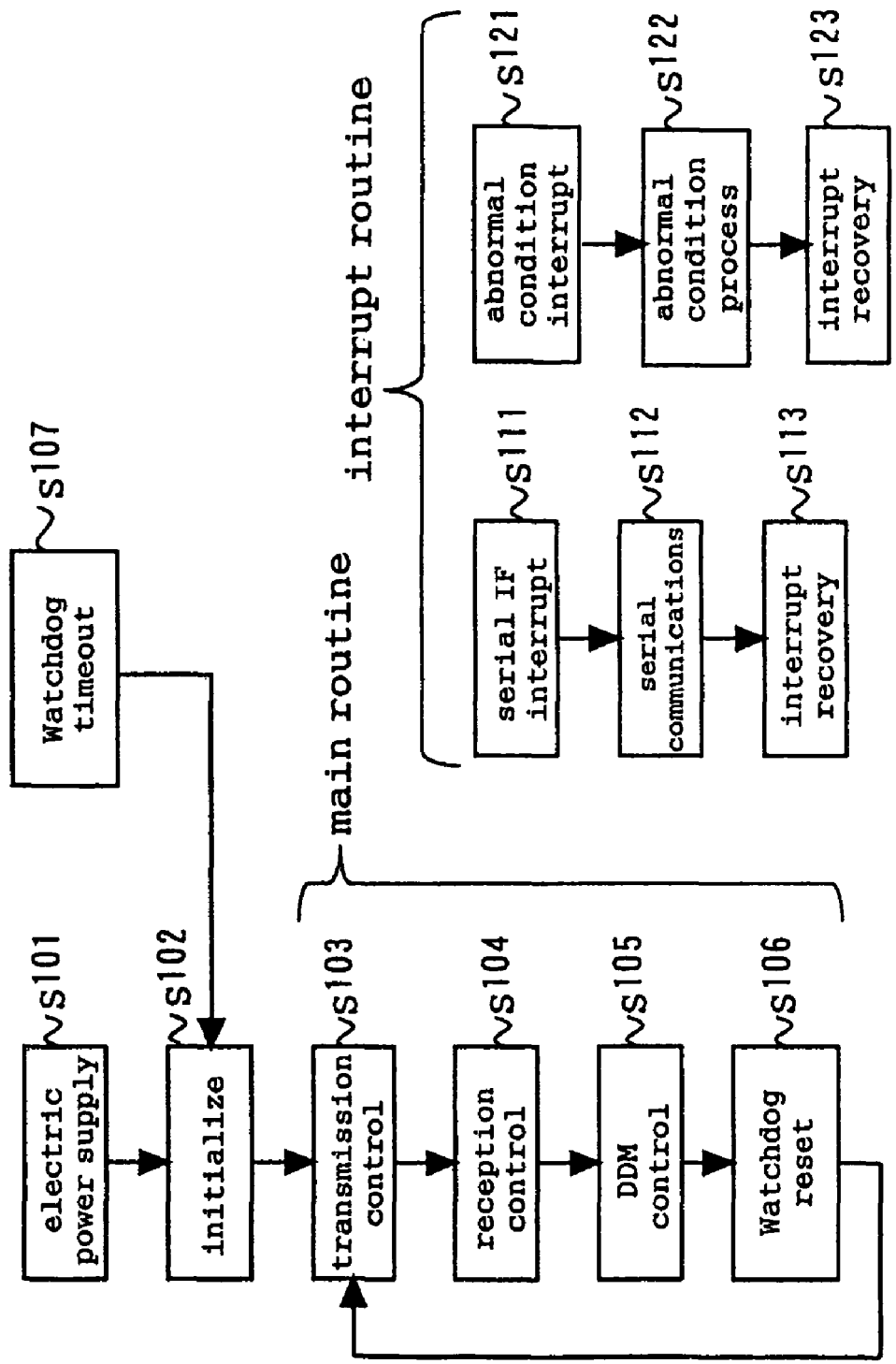
FIG. 4 is a flowchart showing an algorithm of the control software that controls the optical transceiver according to the first embodiment.

Control of the optical transceiver according to the first embodiment is described below. FIG. 4 is a flowchart showing an algorithm of the control software that controls the optical transceiver according to the first embodiment.

As shown in FIG. 4, to control the optical transceiver by means of the control software, electric power is first supplied to the optical transceiver in step S101. Next, the control software initializes the processing in step S102. After the initialization, a main routine is repeatedly executed to control signal transmission (in step S103), control signal reception (in step S104), control the DDM (in step S105) and reset a watchdog (in step S106).

In step S103, the DA converter 46 or a DA converter chip connected with the port circuit 48 sets the driver circuit 18 based on a temperature or a power supply voltage.

When the APD is used instead of the PD 26, the DA converter 46 or the DA converter chip connected with the port circuit 48 sets a bias voltage to be applied to the APD to an optimal voltage for each temperature in step S104.

In step S105, the AD converter 50 converts the analog characteristic signal into the digital characteristic value, and the AD conversion interface 52 writes the converted digital characteristic value in the EEPROM 38 or the SRAM 40.

In step S106, the control software resets the timer 56 when the main routine is completed. Due to the resetting of the timer 56, the time period measured by the timer 56 is initialized. When the main routine is not completed until a timeout of the watchdog, the control software performs a watchdog timeout process to initialize the processing as shown in FIG. 4.

When the host device provides a request to write data in the optical transceiver or a request to read data from the optical transceiver, an interrupt occurs. In this case, the control software changes the main routine to an interrupt routine. When the host device provides the request to write data in the optical transceiver, the two-wire serial interface 42 writes data received from the host device in the EEPROM 38 or the SRAM 40 through serial communications in steps S111 to S113. When the host device provides the request to read data from the optical transceiver, the two-wire serial interface 42 reads the data from the EEPROM 38 or the SRAM 40 through the serial communications in steps S111 to S113.

Also when an emergent abnormal condition is detected, an interrupt occurs. For example, when the parameter (bias current value and the like) obtained from the digital characteristic value and indicative of the actual operational characteristic or operational environment exceeds the warning threshold value or the alarm threshold value, an interrupt occurs. In this case, the control software sets the warning flag or the alarm flag in the EEPROM 38 or the SRAM 40 to perform processing to shut down the optical transceiver in steps S121 to S123.

[Management of History Record Indicating Operation of Optical Transceiver According to First Embodiment]

Management of a history record indicating an operation of the optical transceiver according to the first embodiment is described below. The optical transceiver is removable from the host device, as described above. The optical transceiver starts to operate and transmits and receives an optical signal under the condition that the optical transceiver is attached to the host device. In this case, the host device transmits, to the optical transceiver, information indicative of the date (hereinafter referred to as the operation start date) when the optical transceiver starts an optical transmitting and receiving operation.

Figure 5:
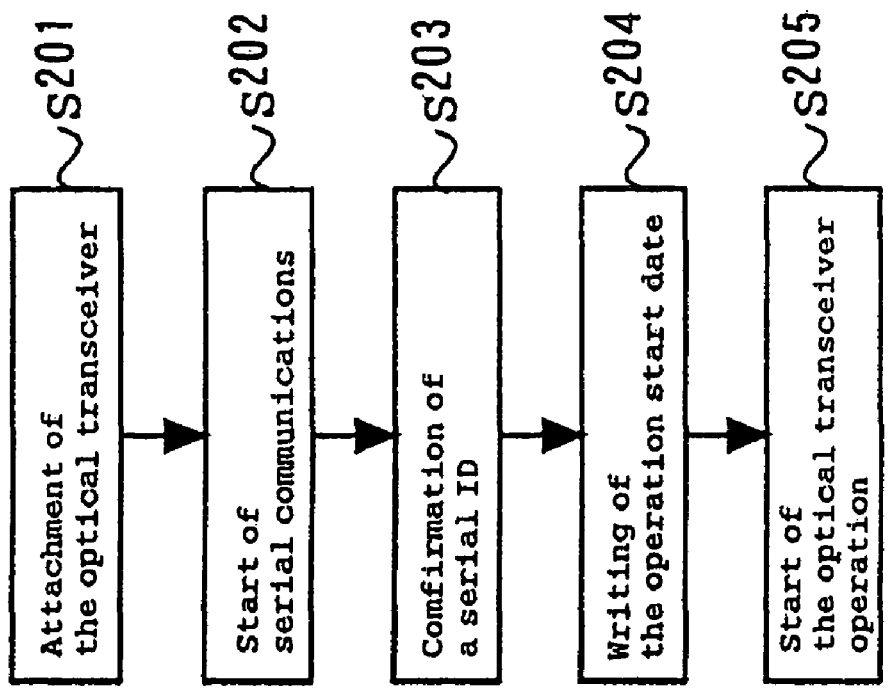
FIG. 5 is a flowchart showing processing for managing a history record indicating the operation of the optical transceiver according to the first embodiment.

FIG. 5 is a flowchart showing processing for managing a history record indicating the operation of the optical transceiver according to the first embodiment. As shown in FIG. 5, in the processing for managing a history record indicating the operation of the optical transceiver, the optical transceiver is connected to the external pin 44 and attached to the host device, and the host device recognizes that the optical transceiver is attached to the host device based on the state of the pin to which the optical transceiver is connected in step S201. The host device then starts serial communications with the optical transceiver based on the recognition in step S202. Next, the host device reads the memory area corresponding to the address A0h and confirms a serial ID in order to confirm that the optical transceiver is a desired optical transceiver in step S203. Then, the host device transmits, to the optical transceiver, information indicative of the operation start date, and the two-wire interface 42 writes the received information indicative of the operation start date in the optical transceiver in step S204. After that, the transceiver starts to operate in step S205.

Figure 6:
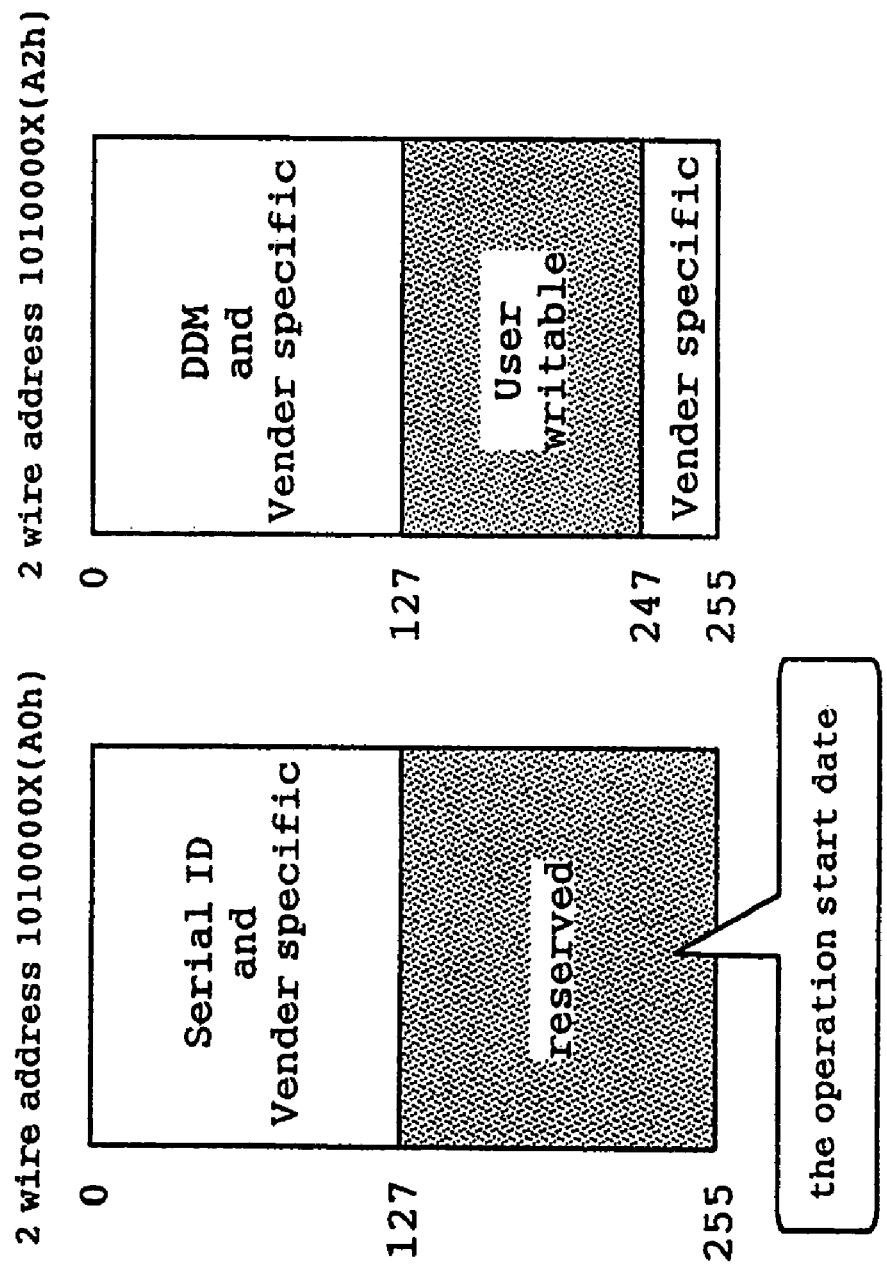
FIG. 6 is a diagram showing memory maps of memory areas that are accessed by the two-wire serial interface in the process for managing a history record indicating an operation of the optical transceiver according to the first embodiment.

FIG. 6 is a diagram showing memory maps of memory areas that are accessed by the two-wire serial interface in the process for managing a history record indicating an operation of the optical transceiver according to the first embodiment. The memory maps shown in FIG. 6 correspond to the memory maps shown in FIG. 3. As shown in FIG. 6, the two-wire serial interface 42 writes, in a reserved area of the memory area, the information indicative of the operation start date in the process for managing a history record indicating an operation of the optical transceiver according to the first embodiment.

The operation start date is represented by six numerical characters and written (for example, when the operation start date is Oct. 1, 2007, the operation start date is represented by 071001). In this case, a memory area of 6 bytes is required to write the information indicative of the operation start date. The EEPROM 38 shown in FIG. 2 is allocated to the memory area in which the information indicative of the operation start date is written.

The two-wire serial interface 42 reads the information indicative of the operation start date from the EEPROM 38 based on a command provided from the external and transfers the read information to the external.

Effect of First Embodiment

As described above, the information indicative of the operation start date is written in the optical transceiver. The written information indicative of the operation start date can be read from the external of the optical transceiver. Therefore, it becomes possible to examine a history record indicating the date when the optical transceiver starts the operation in the past.

In the optical transceiver according to the first embodiment, the EEPROM 38, which is a nonvolatile memory, is allocated to the memory area in which the information indicative of the operation start date is written. Therefore, even when the optical transceiver is rapidly removed from the host device, and power supply to the EEPROM 38 is stopped, the written information indicative of the operation start date is not lost.

In the first embodiment, the operation start date may be represented by Integer parameters and written, instead of the characters. In this case, when the operation start date is Oct. 1, 2007, the operation start date is represented as 071001 with the use of Integer parameters and can be written in a 3-byte memory area that has a smaller capacity than the memory area in which the operation start date represented by the characters is written.

In the first embodiment, the host device may write the information indicative of the operation start date in the optical transceiver after the optical transmitting and receiving operation starts to be performed, not before the optical transmitting and receiving operation starts to be performed.

Second Embodiment

The second embodiment of the present invention relates to an optical transceiver capable of managing a history record indicating an operation of the optical transceiver. Only points different from those of the first embodiment are described below in the second embodiment.

Figure 7:
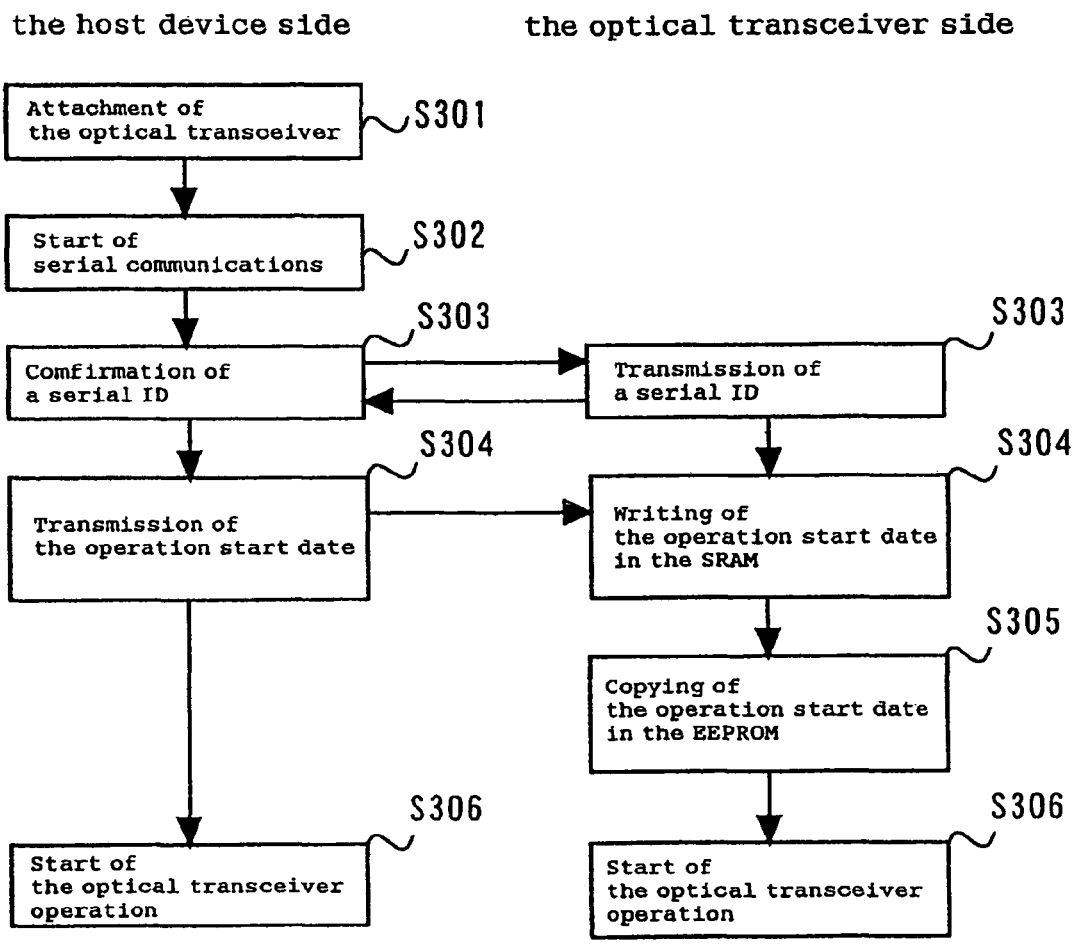
FIG. 7 is a flowchart showing processing for managing a history record indicating the operation of the optical transceiver according to the second embodiment.

FIG. 7 is a flowchart showing processing for managing a history record indicating the operation of the optical transceiver according to the second embodiment. After the host device confirms a serial ID, the host device transmits information indicative of an operation start date to the optical transceiver in step S304. Then, the two-wire serial interface 42 receives the information indicative of the operation start date from the host device and writes the received information in the SRAM (first memory) 40 in step S304. Then, the information processor 54 copies the information (indicative of the operation termination date) written in the SRAM 40 and writes the copied information in the EEPROM (second memory) 44 in step S305. After that, the optical transceiver starts to operate in step S306.

After the operation of the optical transceiver is stopped, and power supply to the SRAM (first memory) 40 is stopped, the power supply to the SRAM 40 is restarted. After the restart of the power supply to the SRAM 40, the information processor 54 copies the information (indicative of the operation start date) written in the EEPROM 38 and writes the copied information in the SRAM 40 when the control software initializes the processing in step S102 shown in FIG. 4.

Effect of Second Embodiment

As described above, the two-wire serial interface 42 writes the information indicative of the operation start date in the SRAM 40. The two-wire serial interface 42 can access the SRAM 40 at a higher speed than that of access to the EEPROM 38. Therefore, the two-wire serial interface 42 can write the information indicative of the operation start date in the SRAM 40 at a higher speed than that of writing of the information in the EEPROM 38.

In addition, the information (indicative of the operation start date) written in the SRAM 40 is copied, and the copied information indicative of the operation start date is written in the EEPROM 38. Therefore, even when the optical transceiver is rapidly removed from the host device, and power supply to the EEPROM 38 is stopped, the written information indicative of the operation start date is not lost.

Third Embodiment

The third embodiment of the present invention relates to an optical transceiver capable of managing a history record indicating an operation of the optical transceiver. Only points different from those of the first embodiment are described below in the third embodiment.

Figure 8:
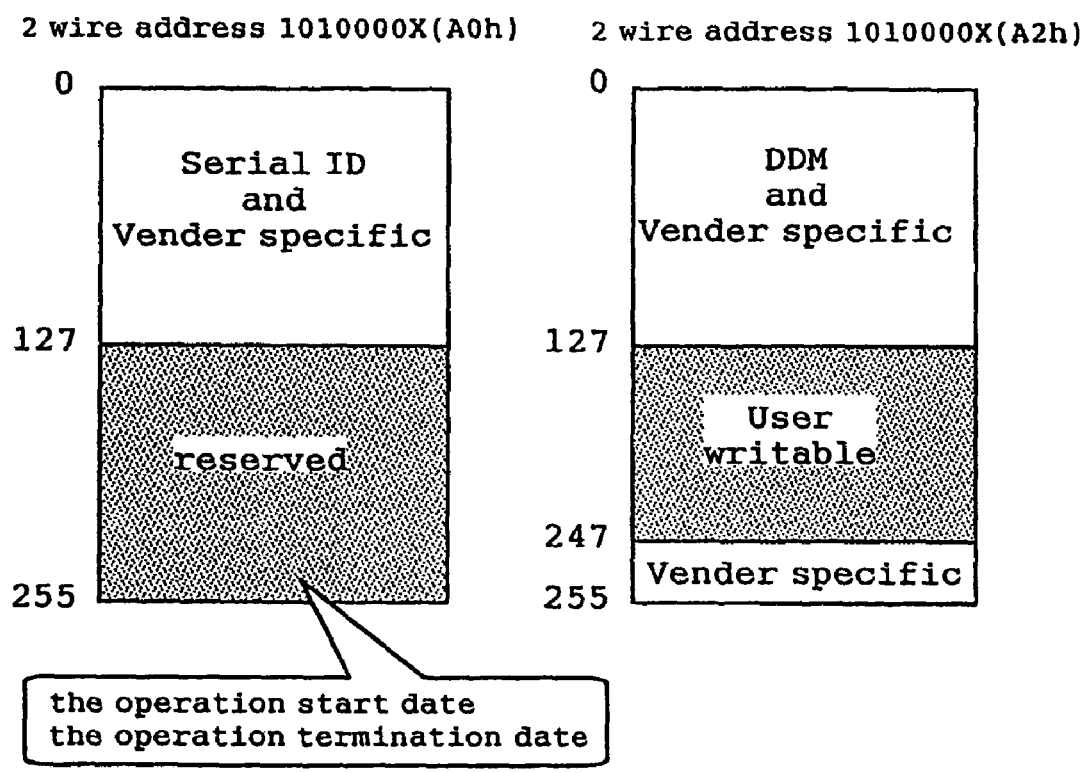
FIG. 8 is a diagram showing memory maps of memory areas that are accessed by the two-wire serial interface in the process for managing a history record indicating an operation of the optical transceiver according to the third embodiment.

FIG. 8 is a diagram showing memory maps of memory areas that are accessed by the two-wire serial interface in the process for managing a history record indicating an operation of the optical transceiver according to the third embodiment. In the process for managing a history record indicating the operation of the optical transceiver according to the third embodiment, the host device terminates communications before the optical transceiver is stopped and physically removed from the host device. Thus, the host device recognizes that the optical transceiver is stopped before the optical transceiver is stopped. Before the optical transceiver is stopped, the host device transmits, to the optical transceiver, information indicative of the date (hereinafter referred to as the operation termination date) when the optical transceiver terminates the optical transmitting and receiving operation. The two-wire serial interface 42 receives the information indicative of the operation termination date, and writes the received information in the SRAM 40.

Therefore, the two-wire serial interface 42 writes both the information indicative of the operation start date and received from the host device and the information indicative of the operation termination date and received from the host device in the reserved area of the memory area. The two-wire serial interface 42 reads the information indicative of the operation start date and the information indicative of the operation termination date in response to a command from the external.

Effect of Third Embodiment

As described above, the information indicative of the operation start date and the information indicative of the operation termination date can be written in the optical transceiver. In addition, the written information indicative of the operation start date and the written information indicative of the operation termination date can be read from the external of the optical transceiver. Therefore, it becomes possible to examine a history record indicating the date when the optical transceiver starts the operation and a history record indicating the date when the optical transceiver terminates the operation.

Only the information indicative of the operation termination date may be written in the optical transceiver. Thus, it is not necessary that both the information indicative of the operation start date and the information indicative of the operation termination date be written in the optical transceiver. In this case, it becomes possible to examine a history record indicating the date when the optical transceiver terminates the operation in the past.

Fourth Embodiment

The fourth embodiment of the present invention relates to an optical transceiver capable of managing a history record indicating an operation of the optical transceiver. Only points different from those of the third embodiment are described below in the fourth embodiment.

The optical transceiver according to the fourth embodiment is sequentially and separately attached to a plurality of the host devices, and performs the optical transmitting and receiving operation under the condition that the optical transceiver is attached to each of the host devices. In the process for managing a history record indicating the operation of the optical transceiver according to the fourth embodiment, information received from the host devices by the optical transceiver includes the operation start date, the operation termination date, identification information for the host devices, and other optional information. The two-wire serial interface (external interface) 42 separately writes the information received from the host devices in the EEPROM (first memory) 38.

Figure 9:
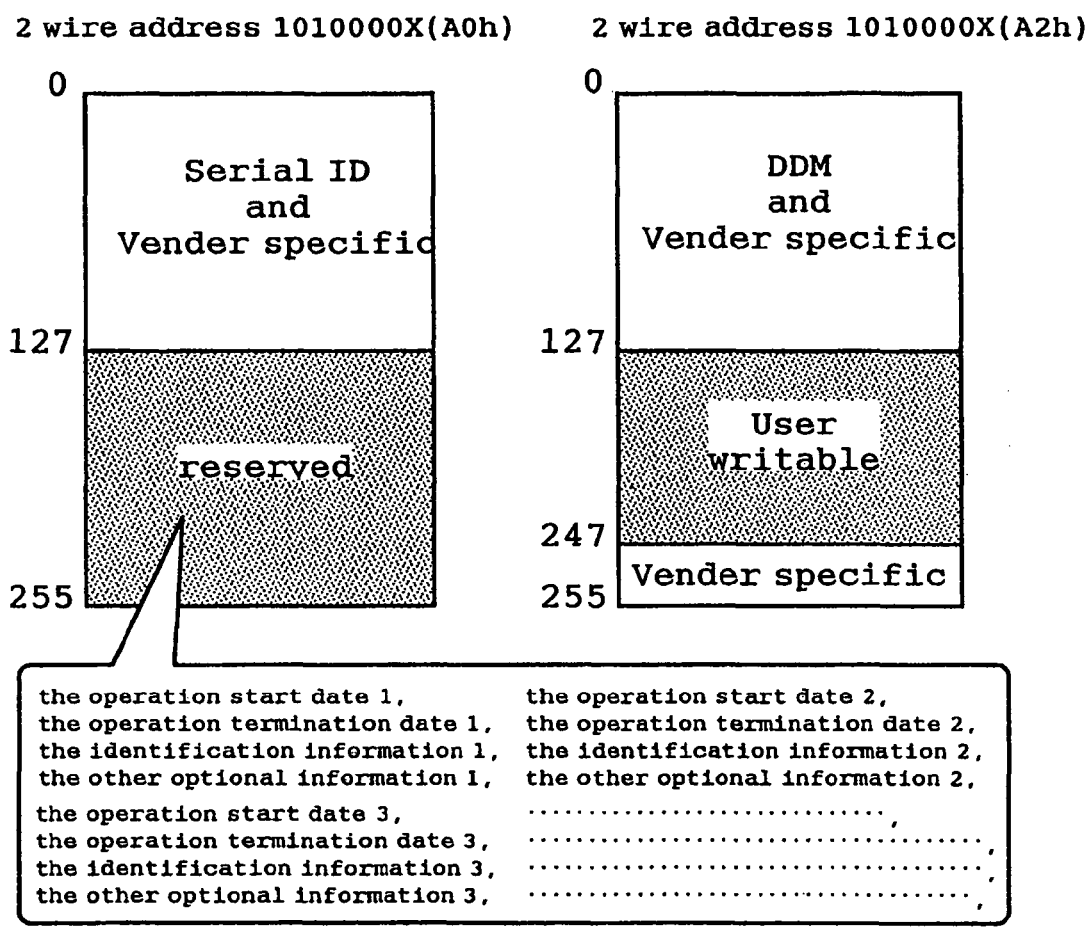
FIG. 9 is a diagram showing memory maps of memory areas that are accessed by the two-wire serial interface in the process for managing a history record indicating the operation of the optical transceiver according to the fourth embodiment.

FIG. 9 is a diagram showing memory maps of memory areas that are accessed by the two-wire serial interface in the process for managing a history record indicating the operation of the optical transceiver according to the fourth embodiment. As shown in FIG. 9, the operation start date, the operation termination date, the identification information for the host device and the other optional information are written in the reserved area of the memory area for each host device. The two-wire serial interface 42 reads the information associated with each of the host devices in response to a command provided from the external.

Effect of Fourth Embodiment

As described above, the information indicative of the operation start date, the information indicative of the operation termination date, the identification information for the host device, and the other optional information can be written in the optical transceiver for each of the plurality of host devices. The information indicative of the operation start date, the information indicative of the operation termination date, the identification information for the host device, and the other optional information, which are associated with each of the host devices, can be read from the external of the optical transceiver.

Therefore, it becomes possible to examine a history record indicating the host device to which the optical transceiver is attached when the optical transceiver starts the operation in the past, a history record indicating the date when the optical transceiver starts the operation in the past and a history record indicating the date when the optical transceiver terminates the operation in the past. Especially, it becomes possible to detect the host device to which the optical transceiver is attached when an abnormal condition occurs during the optical transmitting and receiving operation.

Fifth Embodiment

The fifth embodiment of the present invention relates to an optical transceiver capable of managing a history record indicating an operation of the optical transceiver. Only points different from those of the fourth embodiment are described below in the fifth embodiment.

As described in the first embodiment, the optical transceiver has an unit (analog characteristic signal detection means) for detecting an analog characteristic signal indicative of the operational characteristic or operational environment for the optical transmitting and receiving operation. The unit for detecting an analog characteristic signal includes the monitor PD detection circuit 22, the bias monitor circuit 24 and the received light power monitor circuit 32. As shown in FIG. 2, the optical transceiver has the AD converter (conversion interface) 50 and the AD conversion interface (conversion interface) 52. The AD converter 50 converts the analog characteristic signal into a digital characteristic value, and the AD conversion interface 52 writes the digital characteristic value in the EEPROM (first memory) 38. The two-wire serial interface (external interface) 42 reads the digital characteristic value from the EEPROM 38 in response to a command provided from the external.

The EEPROM (first memory) 38 has stored therein operation characteristic information indicative of an operational characteristic of the optical transceiver. The operational characteristic of the optical transceiver is provided when the optical transceiver is manufactured. The operation characteristic information includes at least one of the value (value of a bias current applied to the laser) of the bias current applied to the driver circuit 18, the value (value of a modulated current applied to the laser) of the modulated current applied to the driver circuit 18, the value of a bias current applied to the driver circuit 18 for each temperature, the value of a modulated current applied to the driver circuit 18 for each temperature, the value of a wavelength of a beam emitted by the laser, the value of a current applied to the monitor photodiode provided on the side of transmission of the laser beam, the value of a power supply current, the value of a power supply current for each temperature, the value of a power supply current for each power supply voltage, a threshold value for a LOS generation on the side of reception of the laser beam, a threshold value for a LOS recovery on the side of the reception of the laser beam, a threshold value for a LOS generation on the side of the reception of the laser beam for each temperature, and a threshold value for a LOS recovery on the side of the reception of the laser beam for each temperature.

Figure 10:
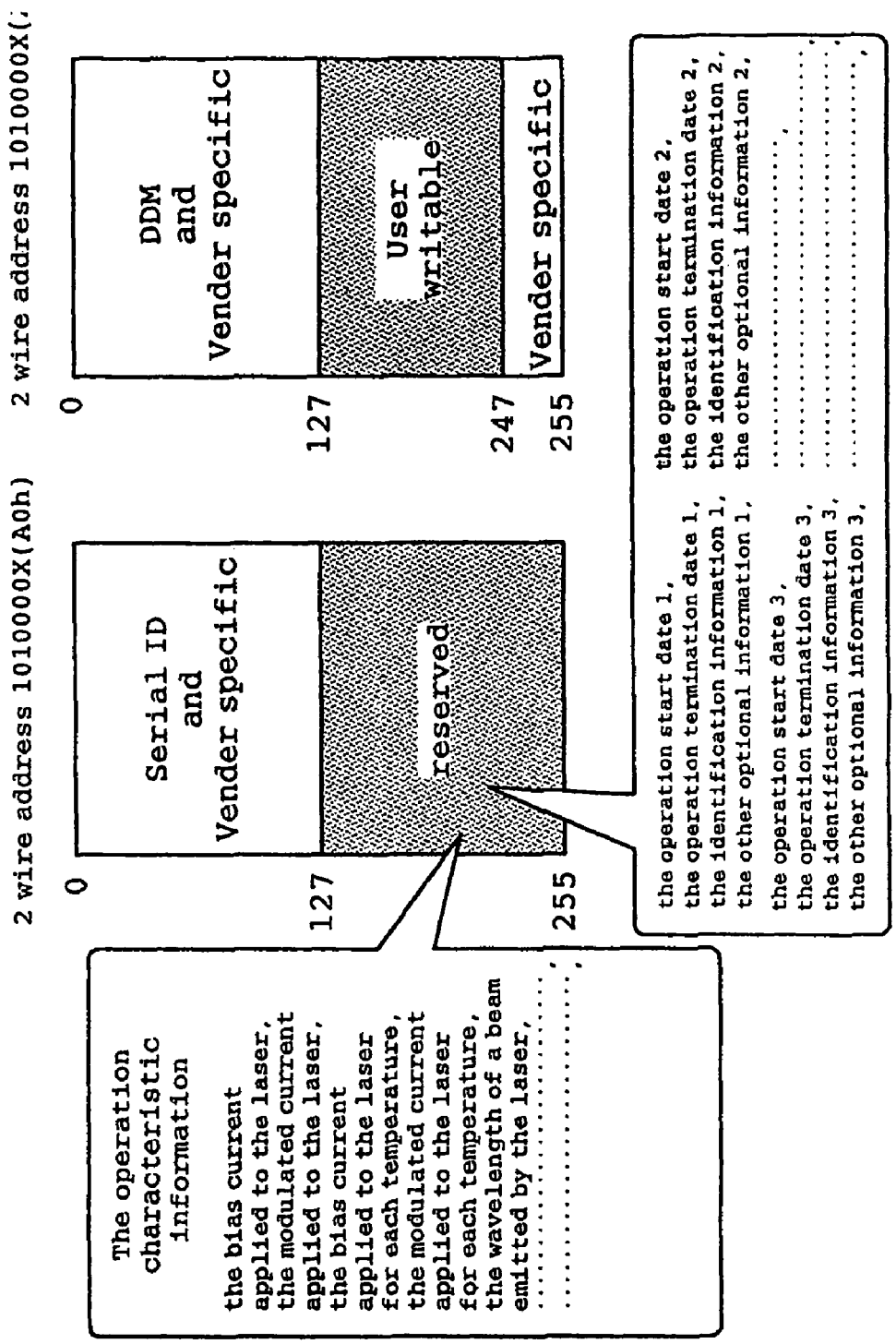
FIG. 10 is a diagram showing memory maps of memory areas that are accessed by the two-wire serial interface in the process for managing a history record indicating the operation of the optical transceiver according to the fifth embodiment.

FIG. 10 is a diagram showing memory maps of memory areas that are accessed by the two-wire serial interface in the process for managing a history record indicating the operation of the optical transceiver according to the fifth embodiment. As shown in FIG. 10, the operation characteristic information is written in the reserved area of the memory area. The two-wire serial interface 42 reads information such as the operation start date and the operation characteristic information at the time of manufacture thereof from the reserved area in response to a command provided from the external.

Effect of Fifth Embodiment

As described above, the digital characteristic value indicative of the operational characteristic or operational environment for the optical transmitting and receiving operation can be written in the optical transceiver. The digital characteristic value can be read from the external of the optical transceiver. In addition, the characteristic information indicative of the operational characteristic (provided when the optical transceiver is manufactured) of the optical transceiver can be read from the external of the optical transceiver.

Therefore, it becomes possible to examine the operational characteristic for the optical transmitting and receiving operation and the operational characteristic obtained when the optical transceiver is manufactured. It becomes possible to compare the operational characteristics with each other. It becomes possible to examine the secular change of the operational characteristic of the optical transceiver.

As shown in FIG. 10, the operation characteristic information is written in the reserved area of the memory area corresponding to the address A0h. However, the operation characteristic information may be written in another area. For example, the operation characteristic information may be written in a memory area corresponding to an address A4h, which is not used in SFF Standard.

Sixth Embodiment

The sixth embodiment of the present invention relates to an optical transceiver capable of managing a history record indicating an operation of the optical transceiver. Only points different from those of the fifth embodiment are described below in the sixth embodiment.

The optical transceiver according to the sixth embodiment has the LD (laser transmitter) 20 shown in FIG. 1. The optical transceiver also has an electronic cooling/heating device (not shown in the drawings) that constantly maintains the temperature of the LD 20. The electronic cooling/heating device may be a Peltier cooler. Data indicative of the value of a bias current applied to the electronic cooling/heating device and data indicative of a target temperature of the LD 20 are written in the EEPROM (first memory) 38 as the operation characteristic information at the time of manufacture thereof as described in the fifth embodiment.

Figure 11:
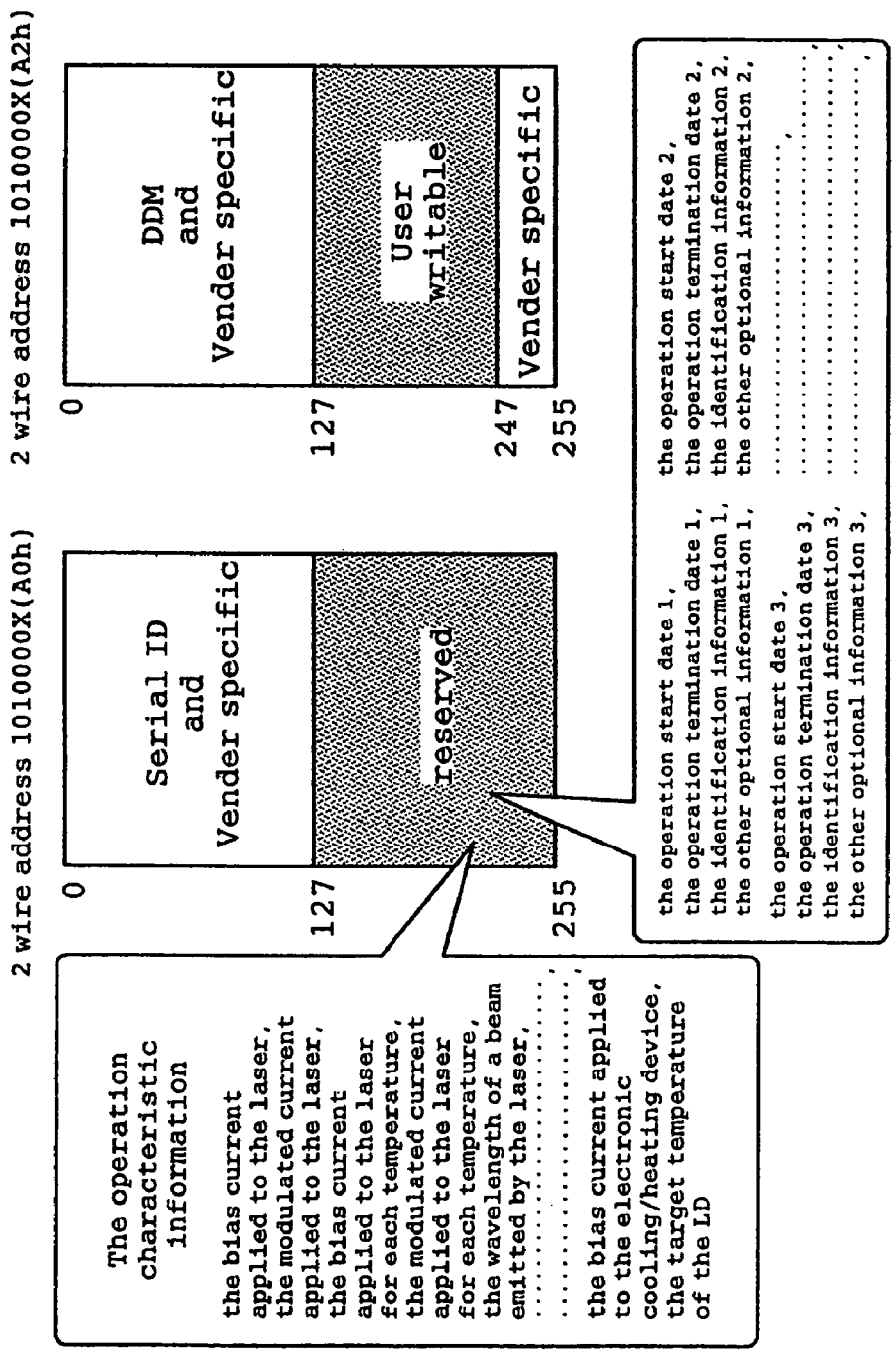
FIG. 11 is a diagram showing memory maps of memory areas that are accessed by the two-wire serial interface in the process for managing a history record indicating the operation of the optical transceiver according to the sixth embodiment.

FIG. 11 is a diagram showing memory maps of memory areas that are accessed by the two-wire serial interface in the process for managing a history record indicating the operation of the optical transceiver according to the sixth embodiment. As shown in FIG. 11, the data indicative of the value of the bias current applied to the electronic cooling/heating device and the data indicative of the target temperature of the LD 20 are written in a reserved area of the memory area. The two-wire serial interface 42 reads information such as the operation start date from the reserved area in response to a command provided from the external. In addition, the two-wire serial interface 42 reads the data indicative of the value of the bias current applied to the electronic cooling/heating device and the data indicative of the target temperature of the LD 20 from the reserved area in response to a command provided from the external.

Effect of Sixth Embodiment

As described above, it becomes possible to examine the value of the bias current applied to the electronic cooling/heating device and the target temperature of the LD 20 after the optical transceiver starts the optical transmitting and receiving operation. It becomes possible to examine different target temperatures of the LDs 20, respectively.

Seventh Embodiment

The seventh embodiment of the present invention relates to an optical transceiver capable of managing a history record indicating an operation of the optical transceiver. Only points different from those of the fourth embodiment are described below in the seventh embodiment.

The host device calculates a cumulative operational time for which the optical transceiver performs the optical transmitting and receiving operation. Next, the host device transmits information indicative of the cumulative operational time to the optical transceiver. Then, the two-wire serial interface 42 receives the information indicative of the cumulative operational time from the host device and writes the received information indicative of the cumulative operational time in the EEPROM (first memory) 38.

The optical transceiver is sequentially and separately attached to a plurality of the host devices, and performs the optical transmitting and receiving operation under the condition that the optical transceiver is attached to each of the host devices. When the optical transceiver has been used in the past, the cumulative operational time is read from the EEPROM 38 and a period of time for which the optical transmitting and receiving operation is performed is added to the cumulative operational time. When the optical transceiver has not been used in the past, the period of time for which the transmitting and receiving operation is performed is treated as the cumulative operational time.

Figure 12:
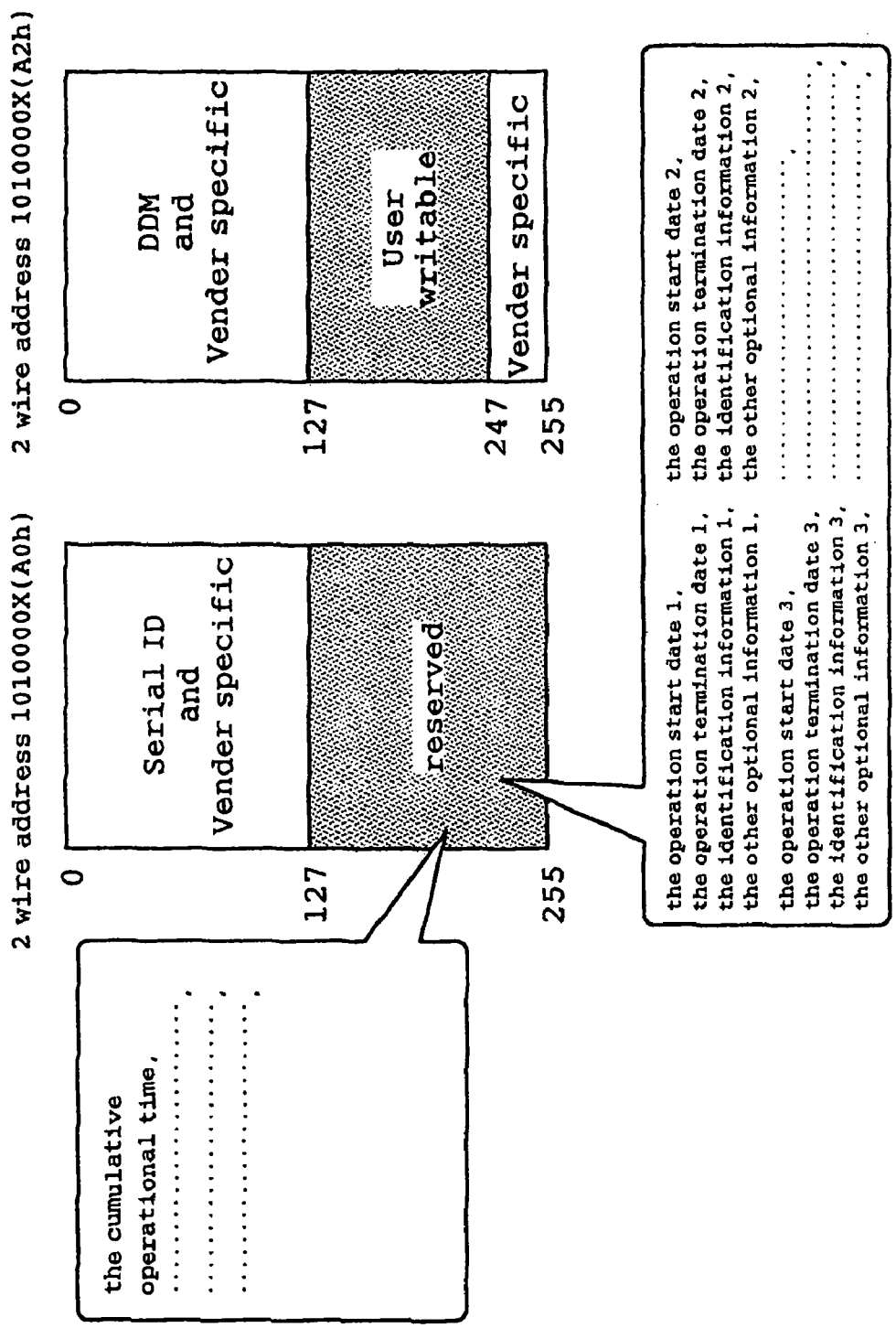
FIG. 12 is a diagram showing memory maps of memory areas that are accessed by the two-wire serial interface in the process for managing a history record indicating the operation of the optical transceiver according to the seventh embodiment.

FIG. 12 is a diagram showing memory maps of memory areas that are accessed by the two-wire serial interface in the process for managing a history record indicating the operation of the optical transceiver according to the seventh embodiment. As shown in FIG. 12, the cumulative operational time is written in a reserved area of the memory area. The two-wire serial interface 42 reads the cumulative operational time in response to a command provided from the external.

Effect of Seventh Embodiment

As described above, the cumulative operational time can be written in the optical transceiver. In addition, the cumulative operational time can be read from the external of the optical transceiver.

A maximum of 25 years will suffice for the cumulative operational time, which means the capacity for recording the cumulative operational time only needs to be large enough to represent approximately 21,900 hours. Thus, a capacity of three bytes will suffice for recording the cumulative operational time even when it is to be represented by the minute with the use of Integer parameters.

Figure 13:
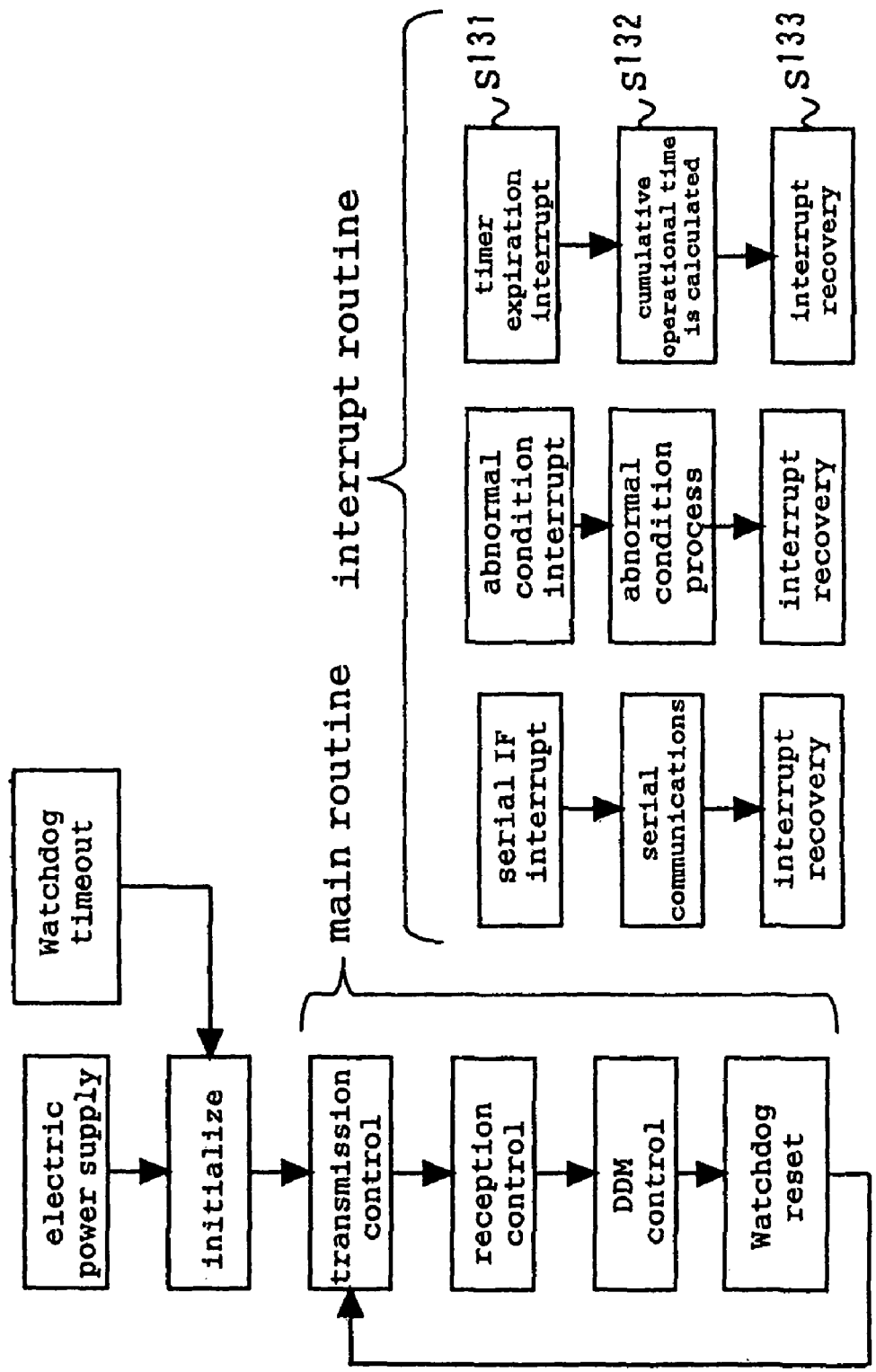
FIG. 13 is a flowchart showing processing for calculating the cumulative operational time by means of the optical transceiver according to the seventh embodiment.

A method for writing the cumulative operational time in the optical transceiver is not limited to the case where the information indicative of the cumulative operational time is received from the host device by the optical transceiver. The optical transceiver may calculate the cumulative operational time. FIG. 13 is a flowchart showing processing for calculating the cumulative operational time by means of the optical transceiver according to the seventh embodiment. As shown in FIG. 13, the timer 56 shown in FIG. 2 expires and an interrupt occurs in steps S131 to S133 every time the main routine is completed. Every time the interrupt occurs, the period of time for which the optical transmitting and receiving operation is performed is calculated based on the count of the timer 56 and a clock frequency of the control circuit 14. The period of time for which the optical transmitting and receiving operation is performed is added to the cumulative operational time written in the EEPROM 38. Every time the cumulative operational time is calculated, the calculated cumulative operational time is written in the optical transceiver.

Eighth Embodiment

The eighth embodiment of the present invention relates to an optical transceiver capable of managing a history record indicating an operation of the optical transceiver. Only points different from those of the seventh embodiment are described below in the eighth embodiment.

The information processor (abnormality detection means) 54 of the optical transceiver determines whether or not the parameter (value of the bias current applied to the driver circuit 18 and the like) indicative of the operational characteristic or operational environment of the optical transceiver exceeds the warning threshold value written in the EEPROM 38 and the alarm threshold value written in the EEPROM 38 in order to detect that an abnormality occurs. The information processor (abnormality detection means) 54 writes information indicative of the time and date when the abnormality occurs and information indicative of the number of times that the abnormality occurs in the EEPROM 38 as abnormality occurrence history record information. In this case, the information processor 54 also writes the cause (e.g., whether or not an abnormality occurs to the value of the bias current applied to the driver circuit 18) of the abnormality in the EEPROM 38.

Figure 14:
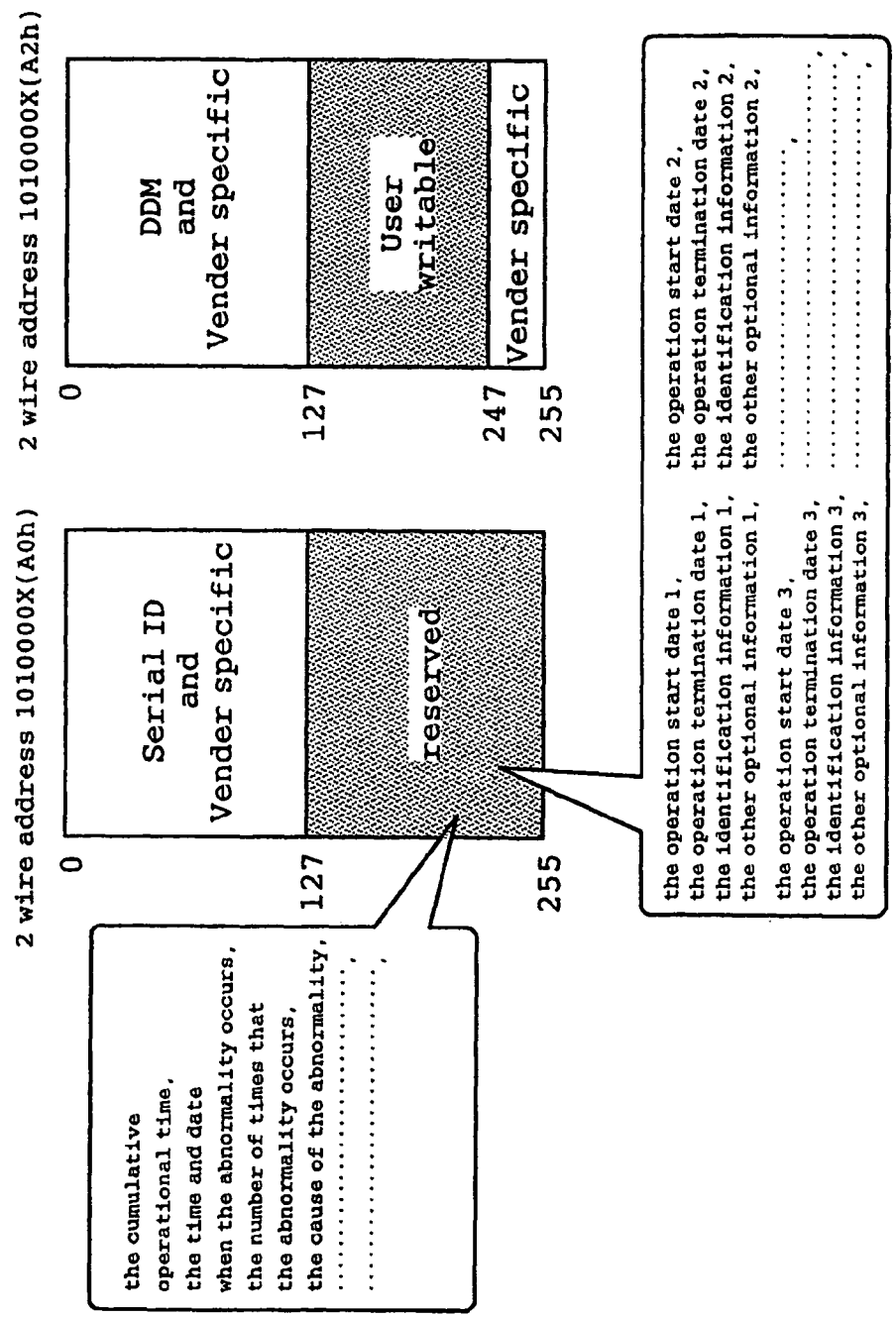
FIG. 14 is a diagram showing memory maps of memory areas that are accessed by the two-wire serial interface in the process for managing a history record indicating an operation of the optical transceiver according to the eighth embodiment.

FIG. 14 is a diagram showing memory maps of memory areas that are accessed by the two-wire serial interface in the process for managing a history record indicating an operation of the optical transceiver according to the eighth embodiment. As shown in FIG. 14, the abnormality occurrence history record information is written in a reserved area of the memory area. The two-wire serial interface 42 reads the abnormality occurrence history record information in response to a command provided from the external.

Effect of Eighth Embodiment

As described above, the abnormality occurrence history record information (that indicates an occurrence of an abnormality in the optical transceiver) can be written in the optical transceiver. In addition, the abnormality occurrence history record information can be read from the external of the optical transceiver.

It becomes possible to examine a history record indicating the host device to which the optical transceiver is attached when an abnormality occurs, the time and date when the optical transceiver operates when the abnormality occurs, and the type of the abnormality.

The major benefits of the present invention described above are summarized follows:

According to the present invention, the optical transceiver capable of managing a history record indicating an operation of the optical transceiver can be provided.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-318071, filed on Dec. 15, 2008 including specification, claims, drawings and summary, on which the Convention priority of the present application is based, are incorporated herein by reference in its entirety.

What is claimed is:

1. An optical transceiver that is removable from a host device and performs an optical transmitting and receiving operation (i) receiving an electrical signal from the host device, converting the electrical signal received into an optical signal, transmitting, externally, the optical signal converted, and (ii) receiving an external optical signal, converting the optical signal received into an electrical signal, and transmitting the electrical signal converted to the host device, when the optical transceiver is attached to the host device, comprising:

a first memory that is a volatile memory;
an external interface that writes information received from the host device in the first memory, reads the information written in the first memory in response to an external command, and transfers externally the read information, wherein the information includes at least one of information indicative of an operation start date, when the optical transceiver starts optical transmitting and receiving operations, and information indicative of an operation termination date, when the optical transceiver terminates the optical transmitting and receiving operations;
a second memory that is a nonvolatile memory;
means for copying the information written in the first memory and writing the information copied in the second memory; and
means for copying the information written in the second memory and writing the information copied in the first memory when power supplied to the first memory is stopped and then restarted.

2. The optical transceiver according to claim 1, wherein the information includes identification information for the host device.

3. The optical transceiver according to claim 2, wherein
the optical transceiver is sequentially and separately attached to a plurality of host devices,
the optical transceiver performs the optical transmitting and receiving operations when the optical transceiver is attached to each of the host devices,
the external interface separately writes the information received from the host devices in the first memory, and
the external interface reads the information received from the host devices in response to an external command and transfers externally the read information.

4. The optical transceiver according to claim 3, further comprising:
means for detecting an analog characteristic signal indicative of an operational characteristic or operational environment of the optical transceiver; and
a conversion interface for converting the analog characteristic signal into a digital characteristic value and writing the digital characteristic value in the first memory, wherein the external interface reads the digital characteristic value from the first memory in response to an external command and transfers externally the digital characteristic value read.

5. The optical transceiver according to claim 4, wherein
the first memory has stored therein operation characteristic information indicative of an operational characteristic of the optical transceiver, the operational characteristic being provided when the optical transceiver is manufactured, and
the external interface reads the operation characteristic information from the first memory in response to an external command and transfers externally the operation characteristic information read.

6. The optical transceiver according to claim 3, further comprising means for detecting that an abnormality has occurred in the optical transmitting and receiving operation, and writing information on the abnormality in the first memory as abnormality occurrence information, wherein the external interface reads the abnormality occurrence information from the first memory in response to an external command and transfers externally the abnormality occurrence information read.

7. The optical transceiver according to claim 1, wherein
the optical transceiver is sequentially and separately attached to a plurality of host devices,
the optical transceiver performs the optical transmitting and receiving operations when the optical transceiver is attached to each of the host devices,
the external interface separately writes the information received from the host devices in the first memory, and
the external interface reads the information received from the host devices in response to an external command and transfers externally the read information.

8. The optical transceiver according to claim 7, further comprising:
means for detecting an analog characteristic signal indicative of an operational characteristic or operational environment of the optical transceiver; and
a conversion interface for converting the analog characteristic signal into a digital characteristic value and writing the digital characteristic value in the first memory, wherein the external interface reads the digital characteristic value from the first memory in response to an external command and transfers externally the digital characteristic value read.

9. The optical transceiver according to claim 8, wherein
the first memory has stored therein operation characteristic information indicative of an operational characteristic of the optical transceiver, the operational characteristic being provided when the optical transceiver is manufactured, and
the external interface reads the operation characteristic information from the first memory in response to an external command and transfers externally the operation characteristic information read.

10. The optical transceiver according to claim 7, further comprising means for detecting that an abnormality has occurred in the optical transmitting and receiving operation, and writing information on the abnormality in the first memory as abnormality occurrence information, wherein the external interface reads the abnormality occurrence information from the first memory in response to an external command and transfers externally the abnormality occurrence information read.

11. The optical transceiver according to claim 1, further comprising:
means for detecting an analog characteristic signal indicative of an operational characteristic or operational environment of the optical transceiver; and
a conversion interface for converting the analog characteristic signal into a digital characteristic value and writing the digital characteristic value in the first memory, wherein the external interface reads the digital characteristic value from the first memory in response to an external command and transfers externally the digital characteristic value read.

12. The optical transceiver according to claim 11, wherein
the first memory has stored therein operation characteristic information indicative of an operational characteristic of the optical transceiver, the operational characteristic being provided when the optical transceiver is manufactured, and
the external interface reads the operation characteristic information from the first memory in response to an external command and transfers externally the operation characteristic information read.

13. The optical transceiver according to claim 12, wherein the operation characteristic information includes at least one of (i) bias current applied to a laser, (ii) modulated current applied to the laser, (iii) bias current applied to the laser for each temperature, (iv) modulated current applied to the laser for each temperature, (v) wavelength of a beam emitted by the laser, (vi) current applied to a monitor photodiode located on a transmission side of the laser beam, (vii) power supply current, (viii) power supply current for each temperature, (ix) power supply current for each power supply voltage, (x) threshold value for a LOS generation on a reception side of the laser beam, (xi) threshold value for a LOS recovery on the reception side of the laser beam, (xii) threshold value for a LOS generation on the reception side of the laser beam for each temperature, and (xiii) threshold value for a LOS recovery on the reception side of the laser beam for each temperature.

14. The optical transceiver according to claim 12, further comprising:
a laser transmitter for transmitting an optical signal externally in the optical transmitting and receiving operations; and
an electronic cooling/heating device for maintaining a constant temperature of the laser transmitter, wherein the operation characteristic information includes information indicative of an operational characteristic of the electronic cooling/heating device.

15. The optical transceiver according to claim 14, wherein the operation characteristic information includes a bias current applied to the electronic cooling/heating device and a target temperature of the laser transmitter.

16. The optical transceiver according to claim 1, further comprising means for detecting that an abnormality has occurred in the optical transmitting and receiving operation, and writing information on the abnormality in the first memory as abnormality occurrence information, wherein the external interface reads the abnormality occurrence information from the first memory in response to an external command and transfers externally the abnormality occurrence information read.

17. The optical transceiver according to claim 1, wherein the information further includes cumulative operational time for which the optical transceiver performs the optical transmitting and receiving operations.

* * * * *